(12) United States Patent  
Maitra

(10) Patent No.: US 8,359,401 B2
(45) Date of Patent: Jan. 22, 2013

(54) NETWORK SWITCH

(75) Inventor: Jayanta Kumar Maitra, San Diego, CA (US)

(73) Assignee: RJ Intellectual Properties, Inc., San Diego, CA (US)

( * ) Notice: Subject to any disclaimer, the term of this patent is extended or adjusted under 35 U.S.C. 154(b) by 363 days.

(21) Appl. No.: 12/613,207

(22) Filed: Nov. 5, 2009

(65) Prior Publication Data

US 2011/0107004 A1 May 5, 2011

(51) Int. Cl.
  G06F 15/16 (2006.01)
  G06F 13/20 (2006.01)
(52) U.S. Cl. .................... 709/232; 209/240; 710/313
(58) Field of Classification Search .......... 709/232, 709/240; 710/313
  See application file for complete search history.

(56) References Cited

U.S. PATENT DOCUMENTS

| | | | |
|---|---|---|---|
| 5,537,585 A | 7/1996 | Blickenstaff et al. | |
| 5,684,918 A | 11/1997 | Abecassis | |
| 5,706,502 A | 1/1998 | Foley et al. | |
| 5,761,663 A | 6/1998 | Lagarde et al. | |
| 5,768,528 A | 6/1998 | Stumm | |
| 5,832,522 A | 11/1998 | Blickenstaff et al. | |
| 5,832,523 A | 11/1998 | Kanai et al. | |
| 5,835,667 A | 11/1998 | Wactlar et al. | |
| 5,850,442 A | 12/1998 | Muftic | |
| 6,332,025 B2 | 12/2001 | Takahashi et al. | |
| 6,438,353 B1 | 8/2002 | Casey-Cholakis et al. | |
| 7,421,532 B2 * | 9/2008 | Stewart et al. | 710/315 |
| 7,480,303 B1 * | 1/2009 | Ngai | 370/395.5 |
| 7,814,259 B2 * | 10/2010 | Stewart et al. | 710/315 |
| 2005/0117578 A1 * | 6/2005 | Stewart et al. | 370/389 |
| 2006/0069926 A1 | 3/2006 | Ginter et al. | |
| 2006/0126612 A1 | 6/2006 | Sandy et al. | |
| 2008/0044141 A1 | 2/2008 | Willis et al. | |
| 2008/0141039 A1 | 6/2008 | Matze | |
| 2008/0181213 A1 | 7/2008 | Ovsiannikov et al. | |
| 2008/0288664 A1 | 11/2008 | Pettey et al. | |
| 2008/0288772 A1 | 11/2008 | Matze | |
| 2008/0304504 A1 | 12/2008 | Stewart et al. | |
| 2011/0202701 A1 | 8/2011 | Maitra | |

FOREIGN PATENT DOCUMENTS

EP      1328104 A2    7/2003

OTHER PUBLICATIONS

PLX Technolgy White Paper, "PEX 8619 DMA Performance Metrics, 16-Lane; 16-Port Gen 2 PCIe Switch with Integrated DMA Engine", Oct. 29, 2009, Version 1.0, pp. 1-37, by PLX Technology.
PLX Technology White Paper, "Non-Transparent Mode: Setup & Demonstration", Apr. 5, 2009, Version 1.0, pp. 1-9, by Carter Buck.

(Continued)

*Primary Examiner* — Patrice Winder
*Assistant Examiner* — Ebrahim Golabbakhsh
(74) *Attorney, Agent, or Firm* — Nields, Lemack & Frame, LLC

(57) ABSTRACT

A system and method for electronically transferring data between servers in a Local Area Network (LAN) requires a Network switch. Essentially, the Network switch incorporates a PCI Express switch that is run by a Central Processing Unit (CPU). A plurality of connectors (i.e. one for each server in the system) is provided to directly connect the PCI Express capability of the respective server to the PCI Express switch. With these connections, the CPU is used to implement an Internet Protocol (IP) routing function in compliance with IP addresses provided by respective servers to route data through the system from one server to another.

16 Claims, 2 Drawing Sheets

OTHER PUBLICATIONS

PLX Technology White Paper, "Using Non-transparent Bridging in PCI Express Systems", Jun. 1, 2004, pp. 1-31, by Jack Regula.

Dolphin Interconnect Solutions White Paper, "Towards a Comprehensive PCI Express Clustering Solution: TCP/IP over PCI Express", Revision 0.5, Apr. 18, 2007, pp. 1-9, by Venkata Krishnan.

RTC Magazine, Technology Connected/Advances with PCI Express, Oct. 2010, "System Area Network Speeds Data Transfer between Servers with PCI Express", 5 pages, by Joey Maitra, Magma.

IDT White Paper, (2008), "Using PCI Express as the Primary System Interconnect in Multiroot Compute, Storage, Communications and Embedded Systems", pp. 1-13, by Kwok Kong.

IDT Application Note, AN-510, Jan. 23, 2007, "Use of Non-transparent Bridging with IDT PCI Express NTB Switches", pp. 1-19, by Kwok Kong.

IDT Application Note, AN-531, Dec. 19, 2007, "PCI Express System Interconnect Software Architecture", pp. 1-20, by Kwok Kong.

PLX Technology/Express Apps, Issue No. 17, Sep. 2005, Application: Processor Isolation in NAS Gateways, PLX Product: PEX 8508-8-lane PCT Express Switch, Sep. 2005, 2 pages.

PLX Technology/NTB Brief, "Non-Transparent Bridging Simplified, Multi-Host System and Intelligent I/O Design with PCI Express", 2004, 4 pages.

* cited by examiner

NETWORK SWITCH

FIELD OF THE INVENTION

The present invention pertains generally to electronic systems and methods that interconnect servers with each other for data transmissions between the servers in Local or Storage Area Networks (LAN or SAN). More particularly, the present invention pertains to systems and methods that use PCI Express technology for direct communication between servers in an area Network. The present invention is particularly, but not exclusively, useful for systems and methods that employ an Internet Protocol for the routing function, and that use PCI Express technology for directly transferring data between servers, to thereby eliminate the Network Interface Card that is required for traditional 10 Gigabit Ethernet connections between servers in a Network.

BACKGROUND OF THE INVENTION

For purposes of the present invention there are basically three levels of data communication. They are: 1) intra-server; 2) intra-Network; and 3) the Internet. Of these, the first two levels of data communication are of particular importance for the present invention. This is so because the emphasis here is primarily on implementing PCI Express technology between the first and second levels (i.e. within the servers and the Network) to establish a so-called "virtual Internet".

There are presently multiple commercially viable methodologies for electronically transferring data between servers. One that is predominant and widely applied commercially is Gigabit Ethernet methodology, which transfers data between servers via serial transmission channels. Another is a more recently developed PCI Express methodology. In comparison, PCI Express is capable of transferring electronic data at much faster rates using a multi-lane serial link in a point-to-point transfer of data. Both of these methodologies are known to be useable at either the intra-server level or the intra-Network level. The methodologies, however, are incompatible and, if used together, require conversions.

Heretofore, data communication between servers in a LAN (i.e. at the [second] intra-Network level) has been primarily accomplished using the slower Gigabit Ethernet methodology. And, this has been the case regardless whether the server itself had an internal PCI Express capability. Thus, as implied above, this has meant the PCI Express methodology needed to be converted to a Gigabit Ethernet methodology for transmission to another server and the intra-Network [i.e. second] level. At the receiving server, the data must again be manipulated for use with the PCI Express technology in the receiving server. The situation has also been somewhat complicated by the fact that IP addresses need to be adapted to the particular technology being used.

With the above in mind, it is an object of the present invention to provide a system and method for using PCI Express technology to transfer electronic data between servers in an area Network. Another object of the present invention is to provide such a system and method that obviates the use of Gigabit Ethernet technology for data transfer and thereby eliminates the need for conversion hardware and software. Still another object of the present invention is to provide a system and method for PCI Express data transfer that incorporates the use of IP addresses in the routing function. Yet another object of the present invention is to provide a system and method for using PCI Express technology to electronically transfer data that is easy to implement, is simple to use and is comparatively cost effective.

SUMMARY OF THE INVENTION

In accordance with the present invention, a system and method for electronically transferring data between servers in an area Network (e.g. LAN or SAN) uses only PCI Express technology. More specifically, PCI Express connectors are used for directly connecting the PCI Express capability on one server to the PCI Express capability of another server. In this connection, there is no conversion required between PCI Express and any other data transfer methodology.

Structurally, the system of the present invention requires a Network switch. In detail, this Network switch includes a PCI Express switch that is run by a CPU. Also, the system requires a plurality of connectors that each include a cable with PCI Express endpoints. In particular, each connector is used in the system to connect a respective server in the Network with the Network switch. To do this, each PCI Express connector has one endpoint that is virtually connected with the IP layer of the server. The other endpoint will then be a non-transparent bridge endpoint that is connected directly to the PCI Express switch of the Network switch. As envisioned for the present invention, the cable of a connector can be made of either copper or fiber optic cabling, and will have greater than an x4 lane capability.

In the operation of the present invention, a server creates or is assigned an IP address for data to be transferred to another server. In this case, the IP address has identifier information that includes identification of the host computer and a Network address. Data with this Network address is then sent directly from the IP layer of the server via the connector using PCI Express technology. Next, the CPU at the Network switch receives the data from the PCI Express switch. The CPU then uses an IP router application to perform a routing function in compliance with the particular IP address. Subsequently, the data is transmitted from the PCI Express switch, over the appropriate connector, to the address at the destination server. This entire operation is done using PCI Express technology with no method conversion required.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
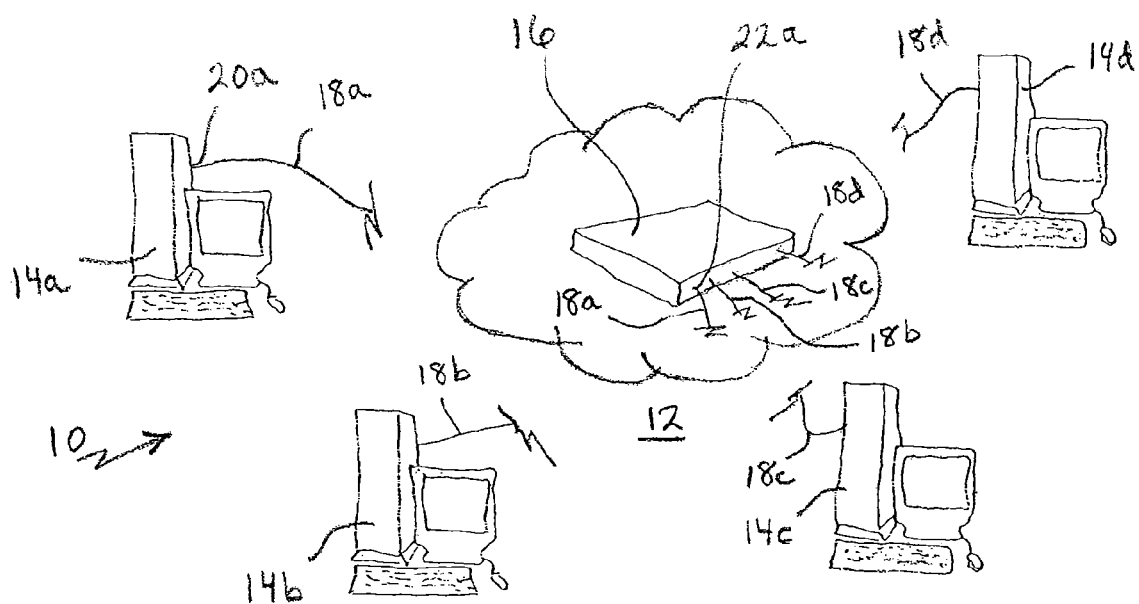
FIG. 1, is a representative drawing of an area Network as envisioned for the present invention.

Referring initially to FIG. 1, a system for electronically transferring data using a Peripheral Component Interconnect Express (PCI Express) technology is shown and is generally designated 10. As shown, the system 10 is intended to service a Local Area Network (LAN) 12 or some similar such Network (e.g. a Storage Area Network (SAN)). In any case, the system 10 will typically include a plethora of servers 14, of which the servers 14a, 14b, 14c and 14d are only exemplary. For the system 10, each of the servers 14a-d is connected directly with a Network switch 16 via a respective PCI Express connector 18a, 18b, 18c or 18d. As envisioned for the present invention, a server 14 can be of any type well known in the pertinent art, such as a mail server, application server or data base server. Further, other peripheral components such as RAID subsystems, Optical Juke Boxes and Tape libraries can be adapted and used in the system 10 in the same manner as servers 14 are used.

Insofar as individual connectors 18 are concerned, and using the connector 18a between server 14a and the Network switch 16 as an example, it will be seen that the connector 18a has a PCI Express endpoint 20a that connects directly to the server 14a. Connector 18a also has a non-transparent bridge endpoint 22a that connects directly into the Network switch 16. Preferably, the connector 18a has a copper cable or fiber optic cabling between endpoints 20a and 22a. The connectors 18b-d are similarly made and have respectively similar endpoints 20b-d and 22b-d.

Figure 2:
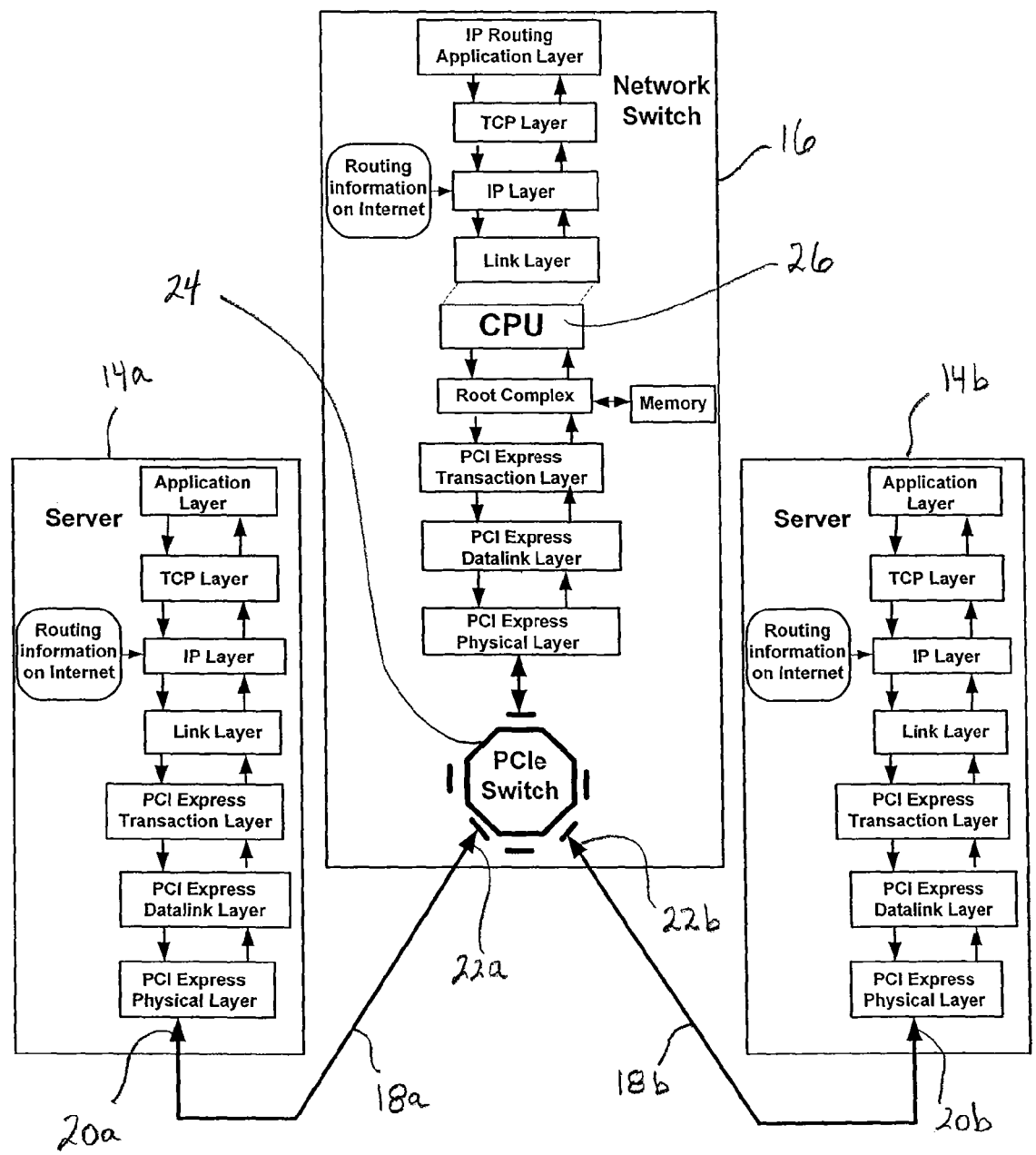
FIG. 2 is a schematic drawing of the components included within a system in accordance with the present invention.

FIG. 2 shows the Network switch 16 in greater detail and indicates that for the system 10, the Network switch 16 will include a PCI Express switch 24 and a Central Processing Unit (CPU) 26. For clarity and purposes of disclosure, only the servers 14a and 14b are shown in FIG. 2. Nevertheless, it is to be appreciated that a plethora of servers 14 may be included in the system 10. In any event, each server 14 is connected to the Network switch 16 by a respective connector 18 and, importantly, this connection is made directly with the PCI Express switch 24. Thus, the point-to-point connection that is necessary for PCI Express technology is established. FIG. 2 also shows that the PCI Express switch 24 is electronically connected to the CPU 26 via a Root Complex interface of a type well known in the pertinent art. With this connection, the CPU 26 effectively runs the PCI Express switch 24. Furthermore, the CPU 26 is able to use the data buffer hardware resources of the PCI Express switch 24 and thereby augment the data buffering functions needed to facilitate the data routing functions discussed below.

For the operation of the system 10, consider an exemplary data transfer from the server 14a to the server 14b shown in FIG. 2. In this example, an Internet Protocol (IP) address is established at the server 14a. Embedded in this IP address is identifier information for the particular host computer on the server 14a, and a destination address at the server 14b within the Network 12. Data with this IP address is then sent from the server 14a to the Network switch 16. Importantly, using PCI Express technology within the server 14a, this data is transferred to the endpoint 20a without any need for conversion from PCI Express technology. In particular, the need for conversion by a Network Interface Card (NIC), as would otherwise be required for traditional 10 Gigabit Ethernet connections, is eliminated. Then, from the endpoint 20a at the server 14a to the endpoint 22a at the Network switch 16, the transfer of data is continued using the PCI Express technology of the connector 18a.

At the Network switch 16, again, there is no need for conversion from the PCI Express technology. Instead, at this point, the CPU 26 in the Network switch 16 effectively runs and controls the PCI Express switch 24 via a Root Complex interface of a type well known in the pertinent art. More specifically, the Network switch 16 uses an IP router application at the CPU 26 to determine where the data is to be sent according to the IP address that was assigned by the server 14a. Accordingly, the PCI Express switch 24 is activated at the endpoint 22b to transfer the data via connector 18b to the server 14b. Still there is no need for conversion from the PCI Express technology (i.e. no need for NIC), and the data is routed to the proper address on server 14b in accordance with the assigned IP address.

While the particular Network Switch as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for using PCI Express technology to transfer electronic data within an area Network at increased transmission rates, the system comprising:
   a plurality of servers in the Network, wherein each server has a PCI Express capability;
   a Network switch, comprising a PCI Express non-transparent bridge;
   a PCI Express switch for establishing a point-to-point connection between the Network switch and each individual server, wherein the PCI Express switch includes data buffer hardware resources and the Network switch uses the data buffer hardware resources of the PCI Express switch to augment the data buffering functions needed to facilitate data routing functions; and
   a plurality of connectors, with each connector being used to connect a respective server with the Network switch, wherein each connector comprises:
   a cable incorporating PCI Express technology, with the cable having a first end and a second end;
   a first device attached to the first end of the cable for engaging the cable with a server, to join the PCI Express capability of the server with the PCI Express technology of the cable; and
   said non-transparent bridge attached to the second end of the cable for engaging the cable with the Network switch to join the PCI Express capability of the Network switch with the PCI Express technology of the cable and
   wherein each connector establishes a multi-lane serial link between a respective server and the Network switch, and further wherein the Network switch uses said non-transparent bridge to selectively establish communications between different servers in the Network to increase data transmission rates between servers in the Network using only PCI Express technology without the need to convert from PCI Express technology.

2. A system as recited in claim 1 wherein the first device is a PCI Express endpoint.

3. A system as recited in claim 1 wherein the system uses a PCI Express data transfer protocol for data transfers between each server and the Network switch.

4. A system as recited in claim 1 wherein each server uses an Internet Protocol (IP) to establish IP addresses with embedded host computer and Network address identifier information, and the Network switch uses an IP router application run by a Central Processing Unit (CPU) to perform a routing function in compliance with each IP address.

5. A system as recited in claim 1 wherein the cable is selected from a group consisting of copper wiring and fiber optic cabling.

6. A system as recited in claim 1 wherein the Network switch includes a Central Processing Unit (CPU) and a Root Complex interface.

7. A system as recited in claim 1 wherein each connector incorporates PCI Express technology and has a greater than x4 lane capability.

8. A system as recited in claim 1 wherein the Network switch has an Internet access capability for establishing a connection between an individual server and the Internet.

9. A system for using PCI Express technology to transfer electronic data within an area Network at increased transmission rates, the system comprising:
- a plurality of servers, wherein each server includes an Internet Protocol (IP) layer for establishing IP addresses having host computer and Network address identifier information embedded in the IP address for routing data, and a protocol driver for electronically connecting the IP layer of the server with a PCI Express endpoint on the server;
- a Network switch with a Central Processing Unit (CPU) incorporating an IP Router function wherein the CPU uses the IP address identifier information from individual servers to route data between servers;
- a PCI Express switch electronically interfaced with the CPU, comprising a PCI Express non-transparent bridge, wherein the PCI Express switch includes data buffer hardware resources and the CPU uses the data buffer hardware resources included in the PCI Express switch to augment the data buffering functions needed to facilitate the data routing functions of the switch; and
- a plurality of connectors, wherein each connector incorporates PCI Express technology between a first end and a second end of the connector, with a first device attached to the first end for engaging the connector with the PCI Express endpoint on the server, and with said non-transparent bridge attached to the second end for engaging the connector with the PCI Express switch attached to the CPU for routing the data within the Network in accordance with an Internet Protocol and for transferring data between servers in the Network at increased transmission rates using only a PCI Express data transfer protocol without the need to convert from PCI Express technology.

10. A system as recited in claim 9 wherein each connector establishes a multi-lane serial link between a respective server and the PCI Express switch, and further wherein the PCI Express switch selectively establishes communications between different servers in the Network.

11. A system as recited in claim 9 wherein each connector incorporates PCI Express technology and has a greater than x4 lane capability.

12. A system as recited in claim 9 wherein each connector includes a cable and the cable is selected from a group consisting of copper wiring and fiber optic cabling.

13. A system as recited in claim 9 wherein the Network switch has an Internet access capability for establishing a connection between an individual server and the Internet.

14. A system as recited in claim 9 wherein the first device is a PCI Express endpoint.

15. A system as recited in claim 9 wherein the Network functions as a Local Area Network (LAN).

16. A system for using PCI Express technology to transfer electronic data within an area Network at increased transmission rates, the system comprising:
- a plurality of servers, wherein each server includes software including an Internet Protocol (IP) layer for establishing IP addresses having host computer and Network address identifier information embedded in the IP address for routing data, and a protocol driver comprising a PCI Express Transaction Layer, and a PCI Express Datalink Layer, for electronically connecting the IP layer of the server with a PCI Express endpoint on the server;
- a Network switch with a Central Processing Unit (CPU) incorporating an IP Router function wherein the CPU uses the IP address identifier information from individual servers to route data between servers, said Network switch comprising software including an IP router application, a PCI Express Transaction Layer, and a PCI Express Datalink Layer;
- a PCI Express switch electronically interfaced with the CPU, wherein the PCI Express switch includes data buffer hardware resources and the CPU uses the data buffer hardware resources included in the PCI Express switch to augment the data buffering functions needed to facilitate the data routing functions of the switch; and
- a plurality of connectors, wherein each connector incorporates PCI Express technology between a first end and a second end of the connector, with a first device attached to the first end for engaging the connector with the PCI Express endpoint on the server, and with a second device attached to the second end for engaging the connector with the PCI Express switch attached to the CPU for routing the data within the Network in accordance with an Internet Protocol and for transferring data between servers in the Network at increased transmission rates using only a PCI Express data transfer protocol without the need to convert from PCI Express technology.

* * * * *